United States Patent [19]

Tomes et al.

[11] Patent Number: 5,023,397
[45] Date of Patent: Jun. 11, 1991

[54] ENTRY BOX

[75] Inventors: Alex Tomes; Gordon McPhedran, both of Calgary, Canada

[73] Assignee: Circa Telecommunications Inc., Calgary, Canada

[21] Appl. No.: 380,010

[22] Filed: Jul. 14, 1989

[30] Foreign Application Priority Data

Jul. 12, 1989 [CA] Canada .................................. 605429

[51] Int. Cl.[5] ............................................. H02G 3/08
[52] U.S. Cl. .................................... 174/50; 174/65 R; 361/356
[58] Field of Search .................... 174/50, 59, 60, 65 R; 361/356; 220/3.92, 3.94

[56] References Cited

U.S. PATENT DOCUMENTS

| Re. 29,371 | 8/1977 | De Bortoli et al. | 174/60 |
|---|---|---|---|
| 3,001,102 | 9/1961 | Stiefel et al. | 361/391 |
| 3,335,326 | 8/1967 | Bonin et al. | 361/428 |
| 3,904,936 | 9/1975 | Hamrick, Jr. et al. | 361/428 |
| 4,051,322 | 9/1977 | Park et al. | 174/65 R |
| 4,160,880 | 7/1979 | Brey | 439/571 |
| 4,536,052 | 8/1985 | Baker et al. | 439/544 |
| 4,731,501 | 3/1988 | Clark et al. | 361/356 X |
| 4,758,924 | 7/1988 | Dillon et al. | 361/383 |
| 4,782,427 | 11/1988 | Marks | 361/356 X |
| 4,818,822 | 4/1989 | Yahraus | 174/65 R X |
| 4,890,318 | 12/1989 | Crane et al. | 174/65 R X |

Primary Examiner—Leo P. Picard
Assistant Examiner—David A. Tone
Attorney, Agent, or Firm—Jeffers, Hoffman & Niewyk

[57] ABSTRACT

A junction box that facilitates the connection of a conductor to a component located within the box. The box comprises a rear panel, side panels extending around the periphery of the rear panel and a front closure panel spaced from the rear panel. A pair of apertures are located in opposite ones of the side panels to allow passage of the conductor through the box. The side panels are formed in two sections with the sections meeting on the center line of the aperture. One section is attached to the rear panel and the other section is attached to a further side panel that extends between the opposite ones of the side panels. The further side panel is releasably connected to the rear panel by a releasable fastening positioned to be accessible upon removal of the closure panel.

21 Claims, 4 Drawing Sheets

ENTRY BOX

The present invention relates to a junction box.

There are a number of applications, most notably in the communications industry, where it is necessary to connect a large number of conductors to a circuit board carrying different components. Typically a cable comprising a large number of conductors is fed into a junction box and a similar cable is fed out of the junction box into the installation being serviced. Such cables tend to have a large number of conductors and, because of the modular configuration of many of these installations, there may be many hundreds of conductors being fed into a series of junction boxes.

Access to the interior of the junction boxes is usually provided by way of a hinged cover that permits removal of damaged components or replacement with different components. Frequently, however, it is necessary to remove the entire box to replace it with one of a different configuration or to replace damaged components in the box. In doing this it is necessary to disturb the conductors with the inherent risk that damage will occur to them. Moreover, the removal and replacement of conductors in adjacent boxes is time consuming and needs the entire system to be rechecked.

It is therefore an object of the present invention to provide a junction box in which the above disadvantages are obviated or mitigated.

According to the present invention there is provided a junction box to facilitate connection of a conductor to a component located within said box, said box comprising a rear panel, side panels extending around the periphery of the rear panel, a front closure panel spaced from the rear panel, a pair of apertures in opposite ones of said side panels to allow passage of said conductor through said box, said opposite ones of said side panels being formed in two sections with one section being attached to said rear panel and the other section being attached to a further side panel extending between said opposite ones of said side panels, each of said two sections having a portion of said aperture formed therein, said further side panel being releasably connected to said rear panel by releasable fastening means positioned to be accessible upon removal of said closure means.

Embodiments of the invention will now be described by way of example only with reference to the accompanying drawings in which.

Figure 1:
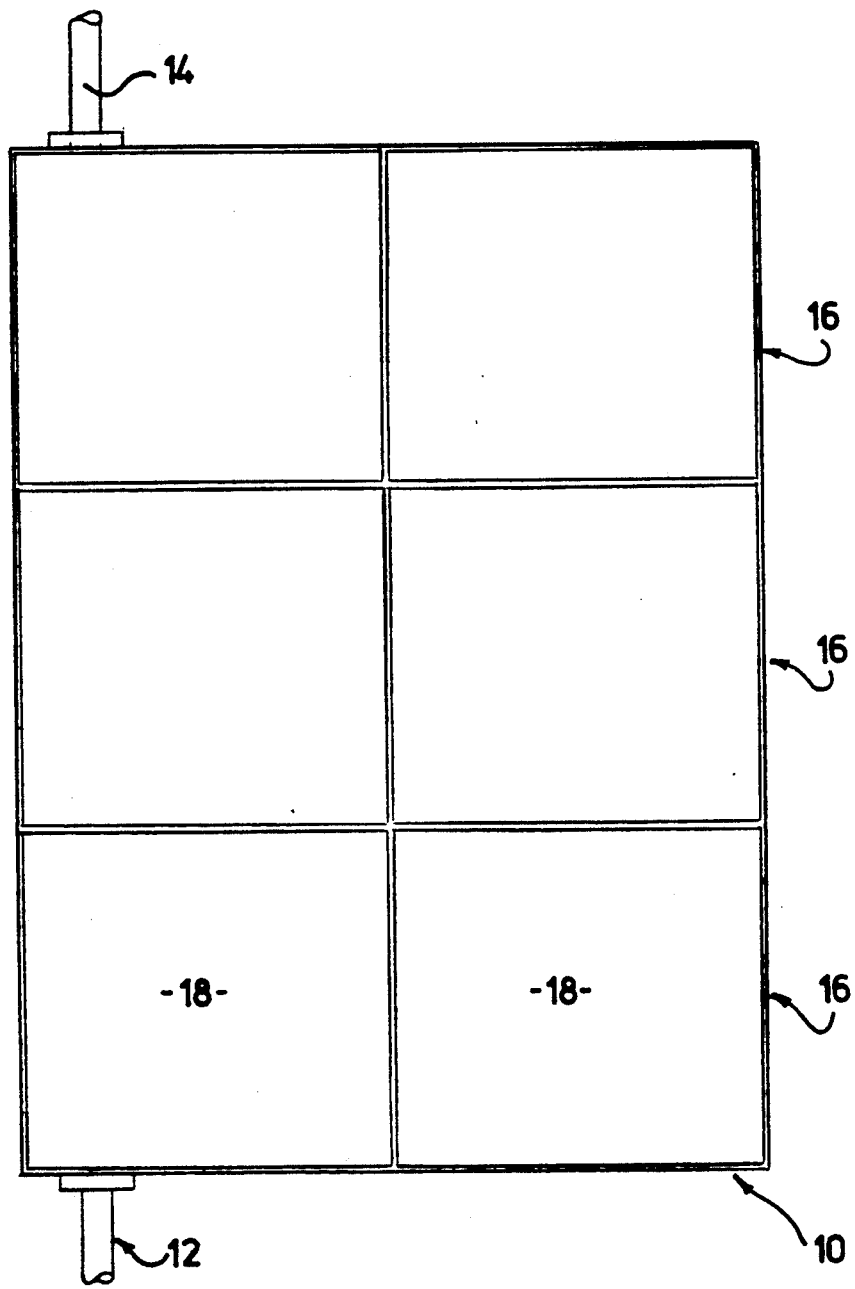
FIG. 1 is a front elevation of a installation having a plurality of junction boxes.

Referring therefore to FIG. 1, a service entry installation indicated generally at 10 includes a feed cable 12 and a supply cable 14 interconnected by junction boxes 16 usually referred to in the telecommunications industry as service entry panels. The boxes 16 are stacked one above the other and each contains components to permit the connection between individual conductors in the cables 12 and 14. Each of the boxes 16 is similar and therefore only one will be described in detail.

Figure 2:
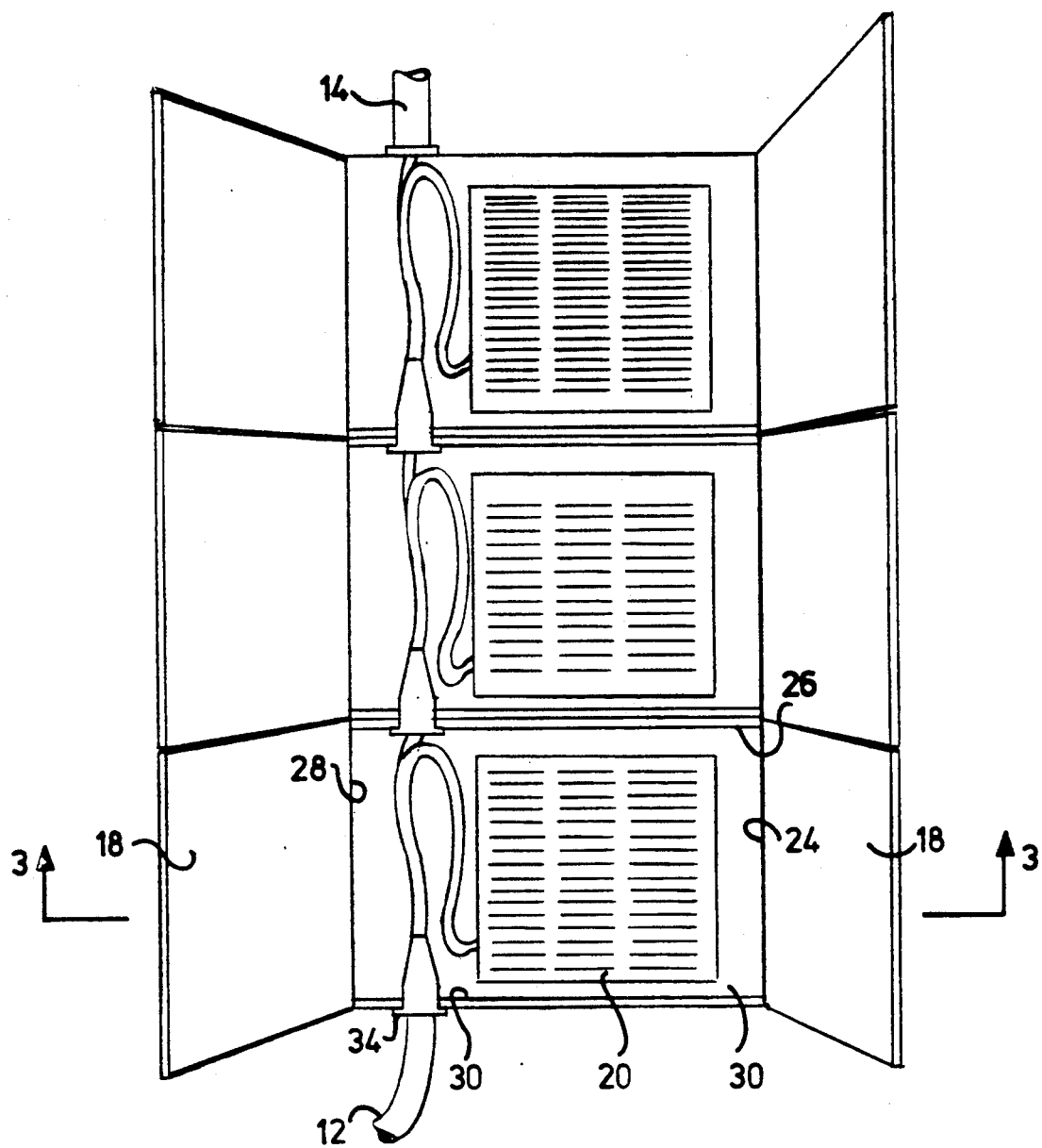
FIG. 2 is a view similar to FIG. 1 with the junction boxes in the open position.
Figure 3:
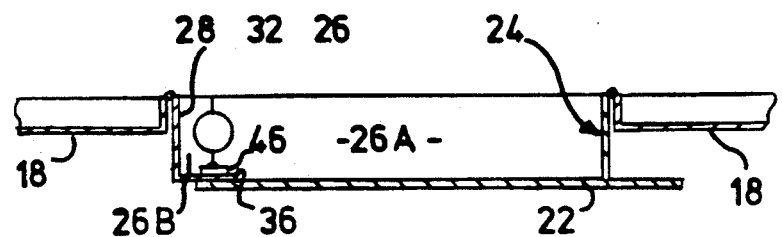
FIG. 3 is a view on the line 3—3 of FIG. 2.

As can best be seen in FIG. 2, each of the boxes 16 includes a pair of hinged doors 18 that may be opened as indicated in FIG. 2 to allow access to the electrical components indicated at 20. These components are typically circuit boards used to establish connections between the conductors at cable 12 and the conductors at cable 14. As is evident from FIG. 2, the conductors of cables 14 extend from one side of each of the boxes 16 to the other with some being diverted to make connections at the components 20 and others passing directly through into the adjacent box.

Each of the boxes 16 includes a rear panel 22 and peripheral side panels 24, 26, 28 & 30. The doors 18 are hinged to front edge of the panels 24, 28 respectively so as to be spaced from the rear panel 22.

To permit passage of the cables 12 and 14, each of the side panels 26 and 30 is formed with an aperture 32. The cable is protected within the aperture 32 by a grommet 34.

Figure 4:
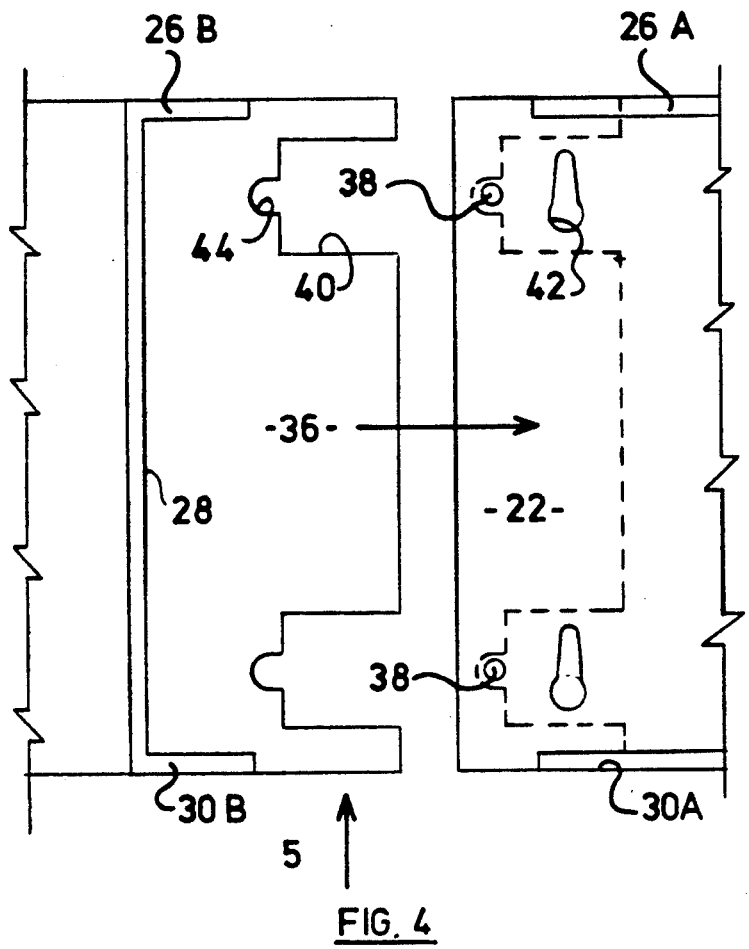
FIG. 4 is a plan view of the box shown in FIG. 3 with components separated.
Figure 5:
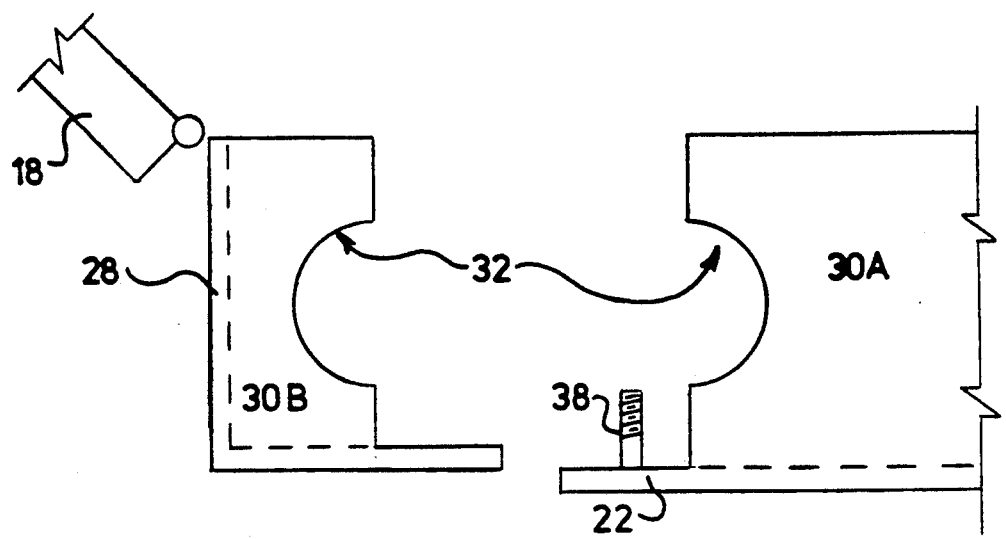
FIG. 5 is a view in the direction of arrow 5 of FIG. 4 on an enlarged scale.

To facilitate removal of a box 16 without unduly disturbing the cables 12 and 14, each of the side panels 26 and 30 are made in two parts indicated as 26A and 26B. The portion of the panel 26A, 30A is secured to the rear panel 22 whereas the portion 26B, 30B is secured to the side panel 28. The two portions meet along the centre line of the aperture 32 so that the box 16 may be removed from around the cable 12, 14. The side panel 28 is secured to the rear panel 22 by means of a flange 36 integrally formed with the side wall 28. As can be seen in FIG. 4 and 5, the rear panel 22 is provided with a pair of upstanding studs 38 along the marginal edge of the rear panel 22. The flange 36 has a pair of cutouts 40 which are dimensioned to pass to either side of keyhole apertures 42 in the rear panel 22 that permit mounting of the box on a support structure. The rear edge of each cutout 40 also includes a semicircular recess 44 that passes around the studs 38 and allow nuts indicated at 46 in FIG. 2 to hold the flange 36 against the rear panel 22.

The box will normally be installed in a fully assembled condition, that is with the side panel 28 forming a part of the box 16. The cables 12 and 14 are then inserted and appropriate connections made to the electrical components 20. If it is necessary to service or change one of the boxes 16, the connections to the components 20 in that box are removed and the nuts 46 loosened. This permits the flange 36 to be slid laterally from the rear panel 22 behind the conductors of cables 12 and 14. Thereafter the mounting screws in keyholes 42 are removed and the balance of the box 16 slid from behind the cable.

Replacement of the box 16 is the reverse of the above with the rear panel first being secured and the flange 36 then slid behind the conductors to be fastened by the nuts 46. It will be seen that in this way the cables running through the box 16 are not unduly disturbed and it is not necessary to remove the connections to the components 20 in adjacent boxes. This significantly reduces the servicing time involved in replacement of components 20 or the entire box 16.

Figure 6:
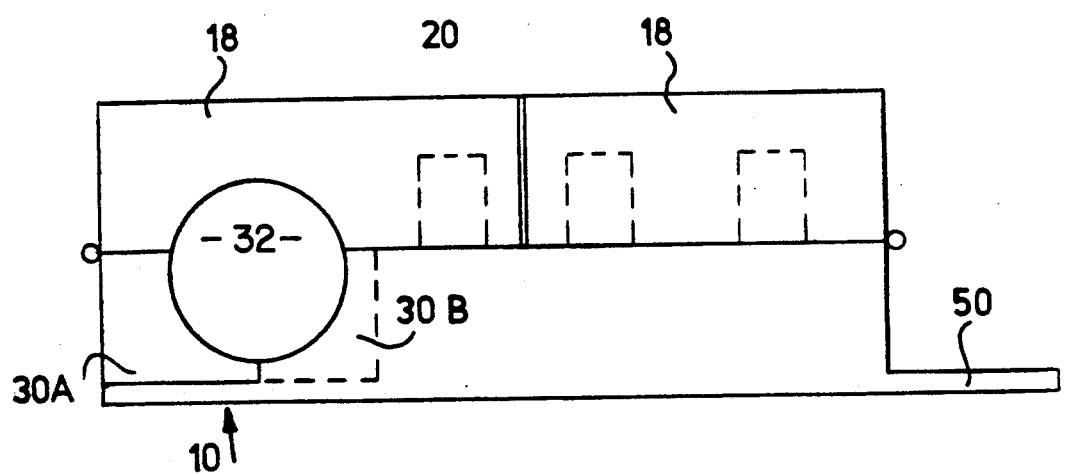
FIG. 6 is a view similar to FIG. 3 of a further embodiment of junction box.

An alternative embodiment is shown in FIG. 6 which is similar to that shown in FIGS. 1 through 5 and with like reference numerals denoting like components. In the arrangement of FIG. 6, however, a portion of the aperture 32 is also formed in one of the side edges of the doors 18 and the components 20 are mounted on a raised plinth 48 formed as part of the rear panel 22. The box is secured to the support structure by a flange 50 extending laterally beyond the wall 24. Again, however, by forming the side panels 26, 30 in two parts, each of which has a portion of the aperture 32 formed therein, it is possible to remove the box 16 without disturbing cables passing through the box.

We claim:

1. A junction box to facilitate connection of a conductor to a component located within said box, said box comprising a rear panel, side panels extending around the periphery of the rear panel, a front closure panel spaced from the rear panel, a pair of apertures in opposite ones of said side panels to allow passage of said conductor through said box, said opposite ones of said side panels being formed in two sections with one section being attached to said rear panel and the other section being attached to a further side panel extending between said opposite ones of said side panels, each of said two sections having a portion of said aperture formed therein, said further side panel being releasably connected to said rear panel by releasable fastening means positioned to be accessible upon removal of said closure panel, said closure panel being pivotally connected to said further side panel to be removable therewith.

2. A box according to claim 1 wherein said further side panel is connected to said rear panel by a flange overlying a marginal edge of said rear panel with said fastening means extending therebetween.

3. A box according to claim 2 wherein said marginal edge includes apertures to facilitate mounting of said box on a support.

4. A box according to claim 3 wherein said flange includes cutouts to maintain access to said apertures when said flange overlies said marginal edge.

5. A box according to claim 4 wherein said fastening means are threaded studs secured to said marginal edge.

6. A box according to claim 5 wherein said flange includes notches to extend partially around said studs.

7. A box according to claim 6 wherein said notches are located in one edge of said cutouts.

8. A box according to claim 7 wherein said closure panel has a lip extending around the periphery thereof.

9. A box according to claim 1 wherein a portion of said aperture is also formed in said closure panel.

10. A box according to claim 1 wherein said closure panel is in the form a pair of hinged doors, one of said doors being pivotally connected to said further side panel.

11. A box according to claim 10 wherein said rear panel has a raised plinth mounted thereon for supporting components within said box.

12. A junction box to facilitate connection of a conductor to a component located within said box, said box comprising a rear panel, side panels extending around the periphery of the rear panel, a front closure panel spaced from the rear panel, a pair of apertures in opposite ones of said side panels to allow passage of said conductor through said box, said opposite ones of said side panels being formed in two sections with one section being attached to said rear panel and the other section being attached to a further side panel extending between said opposite ones of said side panels, each of said two sections having a portion of said aperture formed therein, said further side panel being releasably connected to said rear panel by releasable fastening means positioned within said box and accessible only upon removal of said closure panel.

13. A box according to claim 12 wherein said closure panel is pivotally connected to said further side panel to be removable therewith.

14. A box according to claim 13 wherein said further side panel is connected to said rear panel by a flange overlying a marginal edge of said rear panel with said fastening means extending therebetween.

15. A box according to claim 14 wherein said fastening means are threaded studs secured to said marginal edge.

16. A junction box to facilitate connection of a conductor to a component located within said box, said box comprising a rear panel, side panels extending around the periphery of the rear panel, a front closure panel spaced from the rear panel, a pair of apertures in opposite ones of said side panels to allow passage of said conductor through said box, said opposite ones of said side panels being formed in two sections with one section being integrally formed with said rear panel and the other section being integrally formed with a further side panel extending between said opposite ones of said side panels, each of said two sections having a portion of said aperture formed therein, said further side panel being releasably connected to said rear panel by releasable fastening means positioned to be accesible upon removal of said closure panel.

17. A box according to claim 16 wherein said releasable fastening means are positioned within said box an are accessible only upon removal of said closure panel.

18. A box according to claim 17 wherein said closure panel is pivotally connected to said further side panel to be removable therewith.

19. A box according to claim 18 wherein said further side panel is connected to said rear panel by a flange overlying a marginal edge of said rear panel with said fastening means extending therebetween.

20. A box according to claim 19 wherein said fastening means are threaded studs secured to said marginal edge.

21. A box according to claim 19 wherein said closure panel is in the form of a pair of hinged doors, one of said doors being pivotally connected to said further side panel.

* * * * *